US009371010B2

(12) United States Patent
Holmes et al.

(10) Patent No.: US 9,371,010 B2
(45) Date of Patent: Jun. 21, 2016

(54) INVERTER CONTROL METHOD AND VEHICLE HAVING SAME

(71) Applicant: GM GLOBAL TECHNOLOGY OPERATIONS LLC, Detroit, MI (US)

(72) Inventors: Alan G. Holmes, Clarkston, MI (US); William R. Cawthorne, Milford, MI (US); Michael J. Grimmer, Troy, MI (US); Steven E. Schultz, Torrance, CA (US); John P. Miller, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 443 days.

(21) Appl. No.: 13/794,947

(22) Filed: Mar. 12, 2013

(65) Prior Publication Data

US 2014/0265975 A1    Sep. 18, 2014

(51) Int. Cl.
*H02P 7/08* (2006.01)
*H02P 27/04* (2006.01)
*B60L 15/20* (2006.01)

(52) U.S. Cl.
CPC .............. *B60L 15/20* (2013.01); *B60L 15/2045* (2013.01); *B60L 2210/40* (2013.01); *B60L 2240/423* (2013.01); *B60L 2240/441* (2013.01); *B60L 2240/443* (2013.01); *B60L 2240/526* (2013.01); *B60L 2270/142* (2013.01); *Y02T 10/645* (2013.01); *Y02T 10/7241* (2013.01); *Y02T 10/7283* (2013.01)

(58) Field of Classification Search
USPC ............ 318/452, 400.17, 400.2, 400.26, 801, 318/803
See application file for complete search history.

(56) References Cited

U.S. PATENT DOCUMENTS

| 7,679,310 | B2 | 3/2010 | Schulz et al. | |
|---|---|---|---|---|
| 2009/0107742 | A1* | 4/2009 | Schulz | B60K 6/445 180/65.7 |
| 2009/0108798 | A1* | 4/2009 | Schulz et al. | 318/802 |
| 2009/0115362 | A1* | 5/2009 | Saha | H02P 6/183 318/400.09 |
| 2010/0227722 | A1* | 9/2010 | Conlon | 475/5 |
| 2011/0172859 | A1 | 7/2011 | Sankaran et al. | |
| 2012/0112674 | A1 | 5/2012 | Schulz et al. | |
| 2013/0127383 | A1* | 5/2013 | Kawamura | H02P 27/085 318/400.09 |
| 2014/0067238 | A1* | 3/2014 | Stanek | F02D 17/04 701/112 |

FOREIGN PATENT DOCUMENTS

WO       2010151828   A1    12/2010

* cited by examiner

*Primary Examiner* — Eduardo Colon Santana
*Assistant Examiner* — Iftekhar Mustafa
(74) *Attorney, Agent, or Firm* — Quinn Law Group, PLLC

(57) ABSTRACT

A method of controlling a power inverter coupled to an electric motor in a vehicle powertrain having an engine is provided. The method includes generating a voltage waveform signal and a switching frequency signal for the inverter via a controller. At least one of the voltage waveform signal and the switching frequency signal is at least partially based on at least one commanded engine operating parameter. For example, the engine on/off state, engine torque, and engine speed can be considered. A vehicle having a controller configured to implement the method is also provided.

14 Claims, 4 Drawing Sheets

INVERTER CONTROL METHOD AND VEHICLE HAVING SAME

TECHNICAL FIELD

The present teachings generally include a method for controlling a power inverter of a hybrid vehicle.

BACKGROUND

Motor/generators used in hybrid powertrains typically require that three phase alternating current be fed to the stator windings of the stator. A power inverter includes switches that are moved between on and off positions to pulse the voltage to approximate a desired waveform, separately for each of the three windings. The motor/generator acts as a low pass filter of sorts, to filter the pulsed voltage waveform resulting in an essentially sinusoidal current waveform with small ripple component superimposed. The frequency of the switching can be modified, and the voltage can be held on for different time intervals, and/or the voltage can be held off for different time intervals to implement the desired modulation type (e.g., discontinuous pulse width modulated (DPWM), continuous pulse width modulated (CPWM), etc.).

Inverter switching losses are a significant percentage of the total energy losses for a hybrid electric vehicle. By decreasing the switching frequency, switching energy losses are decreased. However, as switching frequency decreases, the switching noise is generally considered to be more audible, whereas as switching frequency increases, the switching noise is generally considered to be less audible. Inverter control strategies have included masking the noise of the switching, such as at low frequencies, by ensuring that background noise is at a relatively high level. This has been done by limiting low frequency switching to periods when operating characteristics of the motor/generator, such as motor/generator torque level or motor/generator speed level, will ensure sufficient masking of the switching noise.

DPWM can provide essentially sinusoidal current waveforms while simultaneously minimizing inverter switching losses. This is achieved by adding an appropriate zero sequence voltage to each of the inverter phases, while maintaining essentially sinusoidally-shaped line-to-line voltage excitation to the motor/generator. The zero sequence voltage is selected such that each of the inverter phases will be saturated at either 0 or 100 percent duty cycle for one third of the motor fundamental electrical period. Switching losses for a particular phase are eliminated when operating with the 0 or 100 percent duty cycle. The resultant DPWM waveforms employ a single zero vector for each PWM period, as opposed to the two distinct zero vectors used for CPWM implementations. Accordingly, a DPWM waveform, with its less frequent switching, is generally noisier than a CPWM waveform with its more frequent switching. The DPWM type of waveform tends to minimize inverter switching losses while increasing current ripple and acoustic noise as compared with a CPWM type of waveform.

SUMMARY

A method of controlling a power inverter coupled to an electric motor in a vehicle powertrain having an engine is provided. The method includes generating a voltage waveform signal and a switching frequency signal for switches of the inverter via a controller. At least one of the voltage waveform signal and the switching frequency signal is at least partially based on at least one commanded engine operating parameter. For example, the engine on/off state, engine torque, and engine speed can be factors on which the waveform signal or the voltage switching frequency signal is based. By considering one or more engine operating parameters, control of the switches can be optimized for both efficiency and noise reduction over different operating parameters of the powertrain more effectively than if only motor operation or vehicle speed were considered. A vehicle having a controller with a stored algorithm to control the power inverter as described is also provided.

The above features and advantages and other features and advantages of the present invention are readily apparent from the following detailed description of the best modes for carrying out the invention when taken in connection with the accompanying drawings.

DETAILED DESCRIPTION

Figure 1:
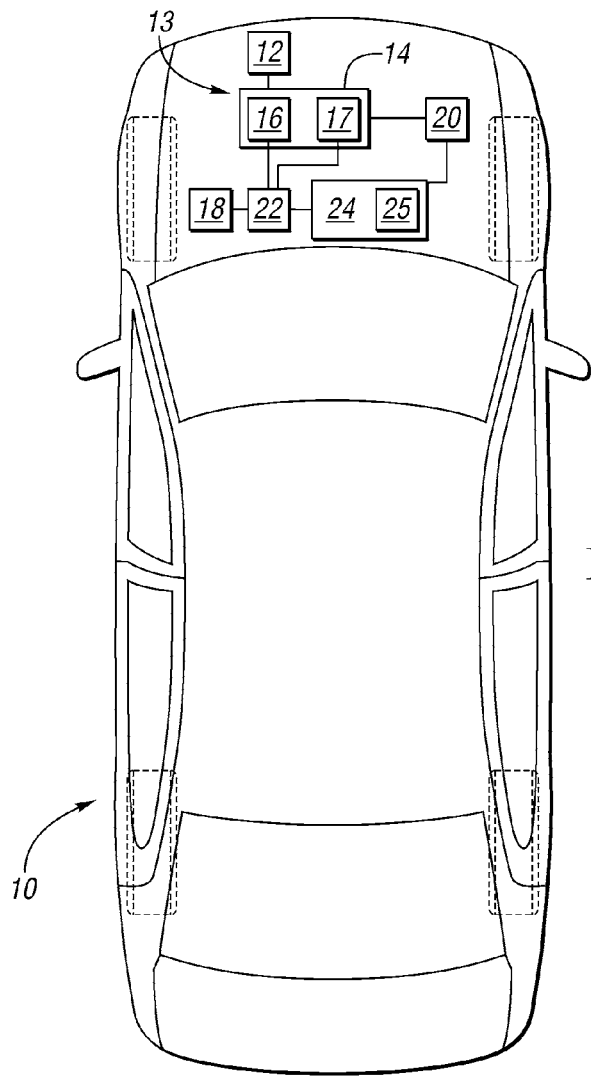
FIG. 1 is a schematic illustration of a vehicle having a hybrid powertrain with an electric motor.

Referring to the Figures, wherein like reference numbers refer to the same or similar components throughout the several views, FIG. 1 schematically illustrates a vehicle 10 including a hybrid powertrain 13 with an engine 12 and a hybrid transmission 14 that includes a first electric motor 16, and, optionally, an additional electric motor 17. The transmission 14 also includes mechanical gearing and, optionally, one or more torque-transmitting mechanisms such as clutches and brakes to enable various speed ratios and operating modes for the transmission 14.

The motors 16, 17 may each be selectively operable as either a motor or a generator, adding power to drive the transmission 14 when operating as a motor, and generating power that is used by the other motor or stored in an energy storage device, such as a battery 18, for later use when operating as a generator. Alternatively, either motor 16, 17 may be operable only as a generator or only as a motor. The motors 16, 17 are alternating current machines. As used herein, the term "alternating current (AC) machine" generally refers to a device or apparatus that converts electrical energy to mechanical energy or vice versa. AC motors can generally be classified into synchronous AC motors and asynchronous AC motors. Synchronous AC motors can include permanent magnet motors and reluctance motors. Permanent magnet motors include surface mount permanent magnet motors (SMPMMs) and interior permanent magnet motors (IPMMs). Asynchronous AC motors include induction motors. Although an AC motor can function as a motor (e.g., an apparatus used to convert AC electrical energy power at its input to produce mechanical energy or power), an AC motor as used herein can also encompass generators that are used to convert mechanical energy or power at its prime mover into electrical AC energy or power at its output. Any of the motors 16, 17 can therefore be an AC motor, an AC generator, or both. An AC motor is an electric motor that is driven by an alternating current. In some implementations, an AC motor includes an outside stationary stator having coils that carry alternating current in response to a voltage applied to the motor to produce a rotating magnetic field, and an inside rotor attached to the output shaft that is given a torque by the rotating field. In other implementations, the rotor can surround the stator.

The transmission 14 can operate in standard, electric, or hybrid modes. In standard operation mode, the transmission 14 is driven only by the engine 12. Under certain operating parameters of the vehicle 10, typically when the power demand for the vehicle 10 is low, the engine 12 may be turned off and the power required to drive the transmission 14 may be provided by the motor 16 and/or the motor 17 in an electric operating mode of operation. In a hybrid operating mode, the engine 12 provides power, and the motor 16 and/or the motor 17 is controlled to function as a motor or a generator. In the hybrid operating mode, the transmission 14 may respond similarly to a continuously variable transmission to provide smooth operation of the vehicle 10 over a wide range of speeds. Once the vehicle 10 has reached a cruising speed, where little or no acceleration is required, the transmission 14 can operate in a fixed gear and be powered only by the engine 12. The fixed gear is selected based upon the cruising speed of the vehicle 10 and the particular transmission 14 and gear ratios. The vehicle 10 may be a plug-in hybrid vehicle, as the methods 100, 200 described herein of controlling the power inverter for the motor are especially advantageous for the types of motors that may be installed on a plug-in hybrid vehicle. A plug-in hybrid vehicle can be equipped with a plug-type interface and an onboard charger for connection to an offboard power supply system used to recharge the battery 18, as is understood by those skilled in the art.

An electronic control unit (ECU) 20 is operatively connected to the engine 12, the motors 16, 17, and the transmission 14 for controlling various vehicle functions, including the operating mode for the transmission 14. The ECU 20 may also be connected to various other components, such as, but not limited to, sensors and control modules useful for controlling the vehicle 10. The electronic control unit 20 can also be referred to as a hybrid controller, as it includes a hybrid control processor 21, indicated in FIG. 2, that includes a stored algorithm for determining and executing the various operating modes of the powertrain 13 under various operating conditions.

A power inverter 22 and a motor controller 24 are also operatively connected to the ECU 20 for controlling operation of the motor 16. The motor controller 24 receives sensed vehicle data and commanded vehicle operating parameters from the ECU 20. The motor controller 24 has a processor 25 with one or more stored algorithms that control operation of the electric motors 16, 17, and control the switching frequency of the power inverter 22 and pulsed voltage waveform established by the power inverter 22 to produce multi-phase current in the motor 16 as described herein. As used herein, the term "multi-phase" refers to two or more phases, and can be used to refer to electric motors that have two or more phases. A multi-phase electric motor is typically provided with current in response to voltage applied via a multi-phase PWM inverter. One example of such a multi-phase motor is a three-phase alternating current (AC) motor. In a three-phase system, the inverter 22 would be a three-phase inverter to drive one or more three-phase AC motors 16, 17. A star or delta connection scheme can be used, as is understood by those skilled in the art.

The algorithms that control switching frequency and waveform are described herein as being stored on the processor 25 of the motor controller 24; alternatively, the algorithms can be carried out by both the ECU 20 and the motor controller 24 in that some of the method steps can be carried out by the ECU 20, while others can be carried out by the motor controller 24. For instance, the ECU 20 can make determinations regarding engine operating parameters and provide control signals (i.e., 0 or 1 bits) based on these to the motor controller 24, while the motor controller 24 can make determinations regarding motor operating parameters. Alternatively, the ECU 20 and motor controller 24 can be combined in a single controller.

Figure 2:
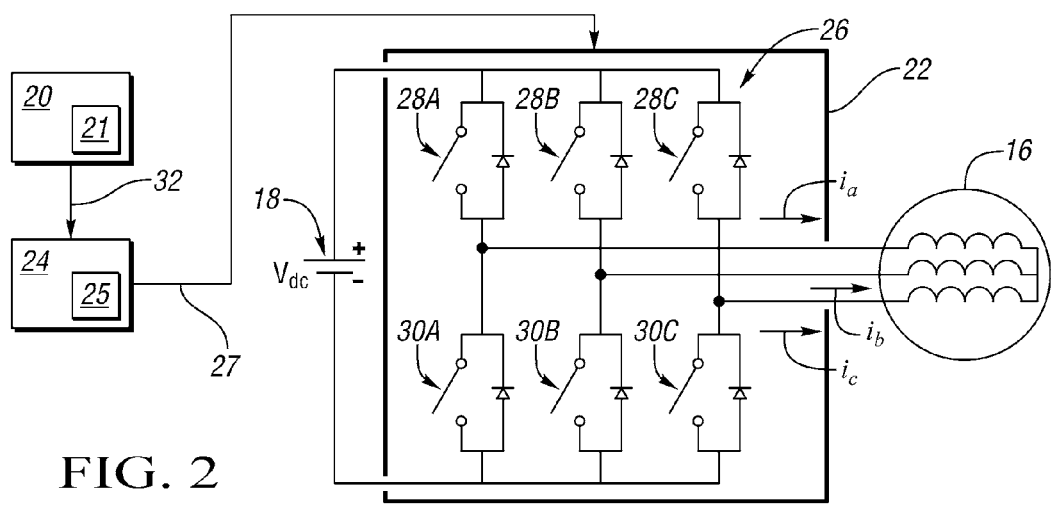
FIG. 2 is a schematic illustration of a hybrid motor controller, a power inverter, and an electric motor of the vehicle of FIG. 1.

Referring to FIG. 2, the controller 24 inputs control signals, referred to herein as duty cycle command signals 27, to the inverter 22 based on commanded vehicle operating parameters provided by the ECU 20. The duty cycle command signals 27 can include a voltage waveform signal, a frequency signal, and a dithering signal. The inverter 22 receives DC input voltage ($V_{dc}$) from the battery 18 The inverter 22 includes a three-phase circuit 26 with a plurality of switches 28A, 28B, 28C, 30A, 30B and 30C that are switched at a controlled frequency, according to the duty cycle command signals 27, to generate a desired voltage waveform from the DC input voltage ($V_{dc}$) from the battery 18 resulting in three-phased AC output $i_a$, $i_b$, $i_c$ in the motor 16. Three of the switches 28A, 28B, 28C, are connected to the positive output of the battery 18 and three of the switches 30A, 30B and 30C are connected to the negative output of the battery 18. Additionally, in the embodiment shown, the plurality of switches 28A, 28B, 28C, 30A, 30B and 30C are connected to form three pairs having three current outputs $i_a$, $i_b$, $i_c$ from the inverter 22. That is, the output of switch 28A is connected to the output of switch 30A to form the current output $i_a$ from the inverter 22. The output of switch 28B is connected to the output of switch 30B to form the current output $i_b$ from the inverter 22. Finally, the output of 28C is connected to the output of switch 30C to form the current output $i_c$ from the inverter 22. DC power from the battery 18 causes a three-phase output $i_a$, $i_b$, $i_c$ by repeatedly opening and closing the plurality of switches 28A, 28B, 28C, 30A, 30B and 30C at a controlled frequency based upon the duty cycle command signals 27 from the controller 24 to establish a controlled waveform. Although the inverter 22 is shown with three sets of switches and three current outputs as the motor 16 is a three-phase motor, the inverter 22 and motor 16 could be configured to operate with additional phases. If a delta connection scheme is used, the output currents $i_a$, $i_b$, $i_c$ are not the phase currents in the motor windings, as is understood by those skilled in the art.

Figure 3:
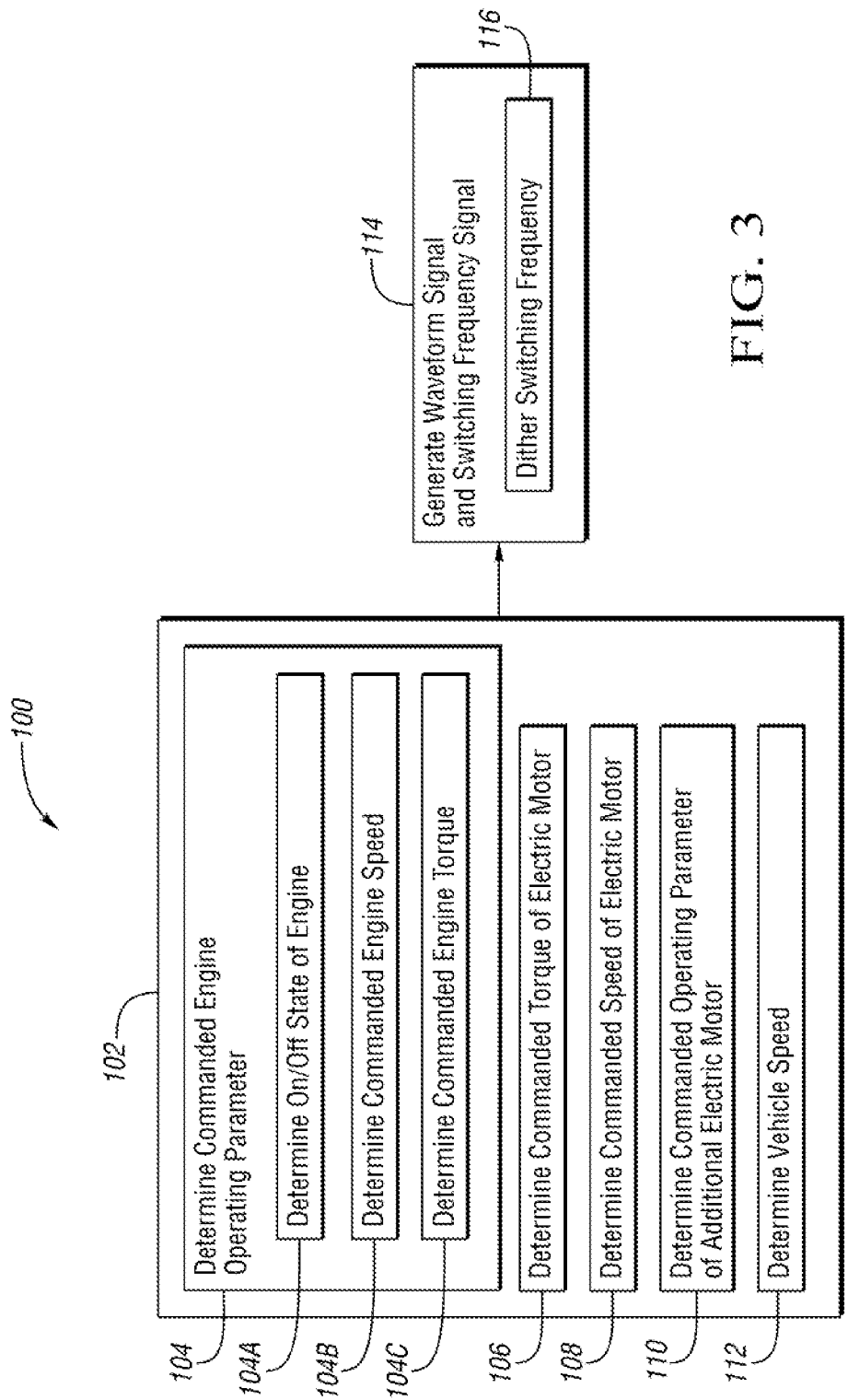
FIG. 3 is a flow diagram of a first method of controlling the power inverter of FIGS. 1-2.

In order to mask switching noises while decreasing switching losses, a method 100 of controlling the power inverter 22 is implemented by the controller 24 as indicted in FIG. 3. The method 100 includes step 102, determining data inputs, and then step 114, generating a waveform signal and a switching frequency signal for the inverter 22 based on the inputs in step 102. The data inputs are generally commanded operating parameters, as discussed herein, and may be received as signals 32 from the ECU 20. Step 102 includes step 104, determining at least one commanded engine operating parameter. That is, under the method 100, at least one of the data inputs on which the generated voltage waveform signal and the switching frequency signal are based must be an engine operating parameter.

The engine operating parameter may be an on/off state of the engine 12, engine speed, or engine torque, which may be based on a commanded throttle position. For example, step 104 may include sub step 104A, determining an on/off state of the engine 12. As used herein, the on/off state is "on" if fuel is being supplied to the engine 12, and is "off" is fuel is not being supplied. Supplying fuel to the engine 12 may be determined by a command sent as a control signal from the ECU 20 to actuate a fuel injection system. When the engine 12 is off, no engine masking noise is present, so any switching noises are likely to be more audible than if the engine 12 were on. Accordingly, the waveform signal and switching frequency signal generated in step 114 may be for quieter variants to the extent commanded operating conditions can be achieved with such quieter waveforms. In general, a discontinuous pulse width modulated (DPWM) waveform provides lower losses than a continuous pulse width modulated (CPWM) waveform. The DPWM waveform is more efficient than the CPWM waveform as it involves less switching, with the switches being off during significant portions of each wave period. The DPWM uses only a single zero vector per PWM period which tends to increase current ripple and audible noise. Additionally, lower frequency switching has been generally associated with more audible switching noises.

A variety of different types of DPWM and CPWM techniques can be used in the various embodiments. In general, CPWM is defined as a PWM technique where each phase leg of the inverter 22 is switching continuously over the full 360 degree cycle of the modulated voltage waveform. Some non-limiting examples of suitable CPWM techniques include sine PWM (SPWM), third harmonic injection PWM, and classical space vector PWM (SVPWM).

Likewise, DPWM is defined herein as a PWM technique where each phase leg of the inverter 22 is not switched over the full 360 degree cycle of the modulated waveform. Some examples of suitable DPWM techniques include, but are not limited to, generalized DPWM (GDPWM), DPWM0, DPWM1, DPWM2, DPWMMIN, and DPWM-MAX, as these terms are well understood in the art.

Figure 5:
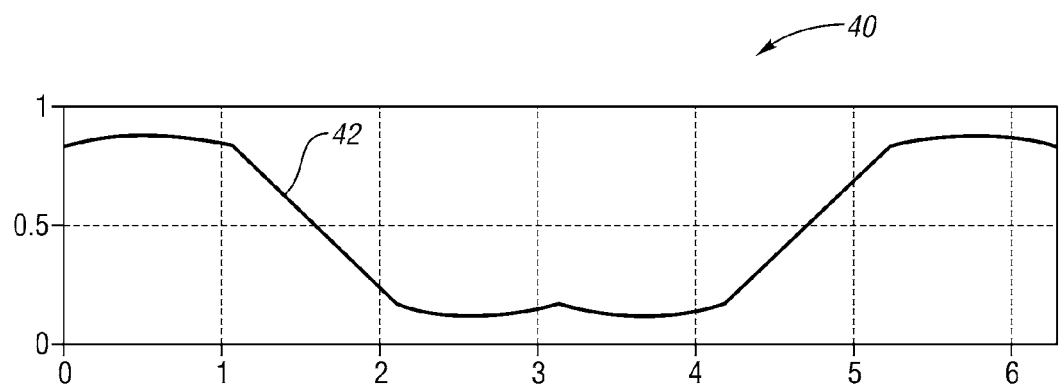
FIG. 5 is a graphical representation of an example voltage waveform of a typical CPWM duty cycle command plotted over one fundamental electrical period of an electric motor.

FIG. 5 is a plot 40 of duty cycle versus angular position (in radians) of an electric motor showing an exemplary waveform 42 of a typical CPWM duty cycle command plotted over one fundamental electrical period (six radians) of an electric motor. In this example, a classical space vector PWM (SVPWM) technique is being utilized. The duty cycle commanded is greater than zero and less than unity over the entire fundamental electrical period of the motor. Because the duty cycle is always greater than zero and less than unity, the corresponding inverter switches are constantly switched during operation of the motor. A SVPWM, in comparison to a SPWM, adds some additional harmonics in the pole voltages that can give a higher fundamental voltage output before reaching the maximum voltage limit.

Figure 6:
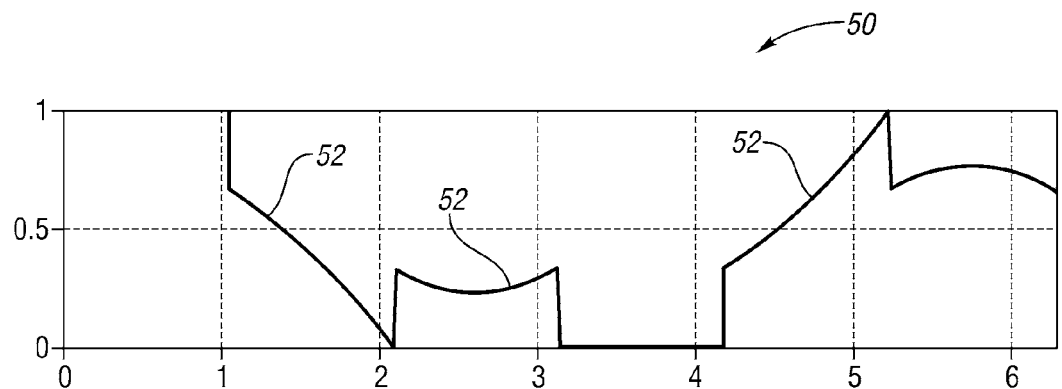
FIG. 6 is a graphical representation of an example voltage waveform of a typical DPWM duty cycle command plotted over one fundamental electrical period of an electric motor.

FIG. 6 is a plot of duty cycle versus angular position (in radians) of an exemplary waveform 50 of a typical DPWM duty cycle command plotted over one fundamental electrical period of an electric motor. In this example, a DPWM2 technique is being utilized. In the illustrated DWPM duty cycle command technique, the duty cycle 52 is clamped to either zero or one for two 60 degree (approximately 1 radian) segments of the fundamental electrical period. During these clamped periods, the respective inverter switches will not be switched. Hence, during these clamped periods no switching losses will occur in the corresponding phase leg. Thus, the use of DPWM technique can reduce switching losses to as much as half the level that would occur using CPWM. DPWM places the harmonic spectrum (motor current, DC bus current) at lower frequency and is more distorted, hence potentially creating more acoustic noise. CPWM places the harmonics at higher frequency and is typically quieter. DPWM is usually more efficient (lower switching losses); hence a trade-off can be made when selecting which method of efficiency versus acoustic noise.

Step 104 may include another sub step 104B, determining a commanded engine speed. The commanded engine speed may be indicated as a signal 32 received from the ECU 20. As engine speed increases, the switching frequency generated in step 114 may decrease, as the increased noise (and greater efficiency) of the lower frequency switching can be sufficiently masked by the engine 12.

Step 104 may include sub step 104C, determining commanded engine torque. The commanded engine torque may be indicated as a signal 32 received from the ECU 20. The commanded engine torque may be achieved by a commanded throttle position. Accordingly, the signal 32 may be for a commanded throttle position. As engine torque increases, the masking noise of the engine 12 may decrease; accordingly, the method 100 may cause the switching frequency generated in step 114 to increase as engine torque increases.

Step 102 can also include data inputs from vehicle operating parameters other than the engine 12. For example, the operating parameters of the electric motor 16 to which the power inverter 22 is operatively connected can be considered. In step 106, the method 100 can determine the commanded torque of the electric motor 16. For relatively low motor torques with the engine 12 off, the waveform generated in step 114 may be a voltage waveform that requires less switching or lower frequency switching, such as a DPWM waveform, as less switching noise is produced at low motor torques. For relatively high motor torques with the engine 12 off, the waveform generated in step 114 may be a voltage waveform that generates relatively less acoustic noise, such as a CPWM waveform, as greater switching noise is produced at high motor torques.

In step 108, the method 100 can determine the commanded speed of the electric motor 16. For relatively low motor speeds, lower frequency switching can be generated in step 114, and for relatively high motor speeds, higher frequency switching can be generated. For a digital control system, the control bandwidth is limited by the sample rate. Additionally, for vector controlled motor drives, the ratio of switching frequency to motor fundamental frequency should remain sufficiently high in order to control the phase currents with high fidelity in a stable manner. Often, the ratio of 10:1 is considered a reasonable limit. Hence, the higher the motor speed, the higher the fundamental frequency, and thus the higher the switching frequency needed for good control.

The method 100 can also consider the operation of any other electric motors operable as tractive motors in the hybrid powertrain 13 that are not operatively connected to the inverter 22. For example, in step 110, the method can determined the torque and/or speed of the motor 17. The waveform and switching frequency signals generated in step 114 for the motor 16 can then be based partially on the effect that the motor 17 has on the overall masking noise and efficiency losses in the powertrain 13.

Additionally, step 102 can include step 112, determining the commanded speed of the vehicle 10. This input data for the vehicle speed can be a combination of the throttle position and commanded engine and motor operating states from which the vehicle speed is determined. The waveform and switching frequency signals generated in step 114 can then be based at least partially on vehicle speed, with the effect of increasing vehicle speed tending to indicate a lower frequency switching signal for the lower switching losses inherent with lower frequency switching, despite the typically increased noise level.

Step 114 can include step 116, in which the switching frequency signal commands dithering of the switching frequency if one or more predetermined vehicle operating parameters are satisfied. The vehicle operating parameters can include, but are not limited to, commanded motor torque of motor 16 being within a range of predetermined motor torques, vehicle speed being within a range of predetermined vehicle speeds, the commanded waveform signal being for a predetermined type of waveform (e.g., DPWM or CPWM), and the commanded frequency signal being for a frequency within a predetermined range of switching frequencies. The relevance of any or all of the vehicle operating parameters considered in the determination of dithering in step 116 can be specifically tuned to the acoustic nature of the particular model of vehicle, as determined by vehicle testing.

Figure 4:
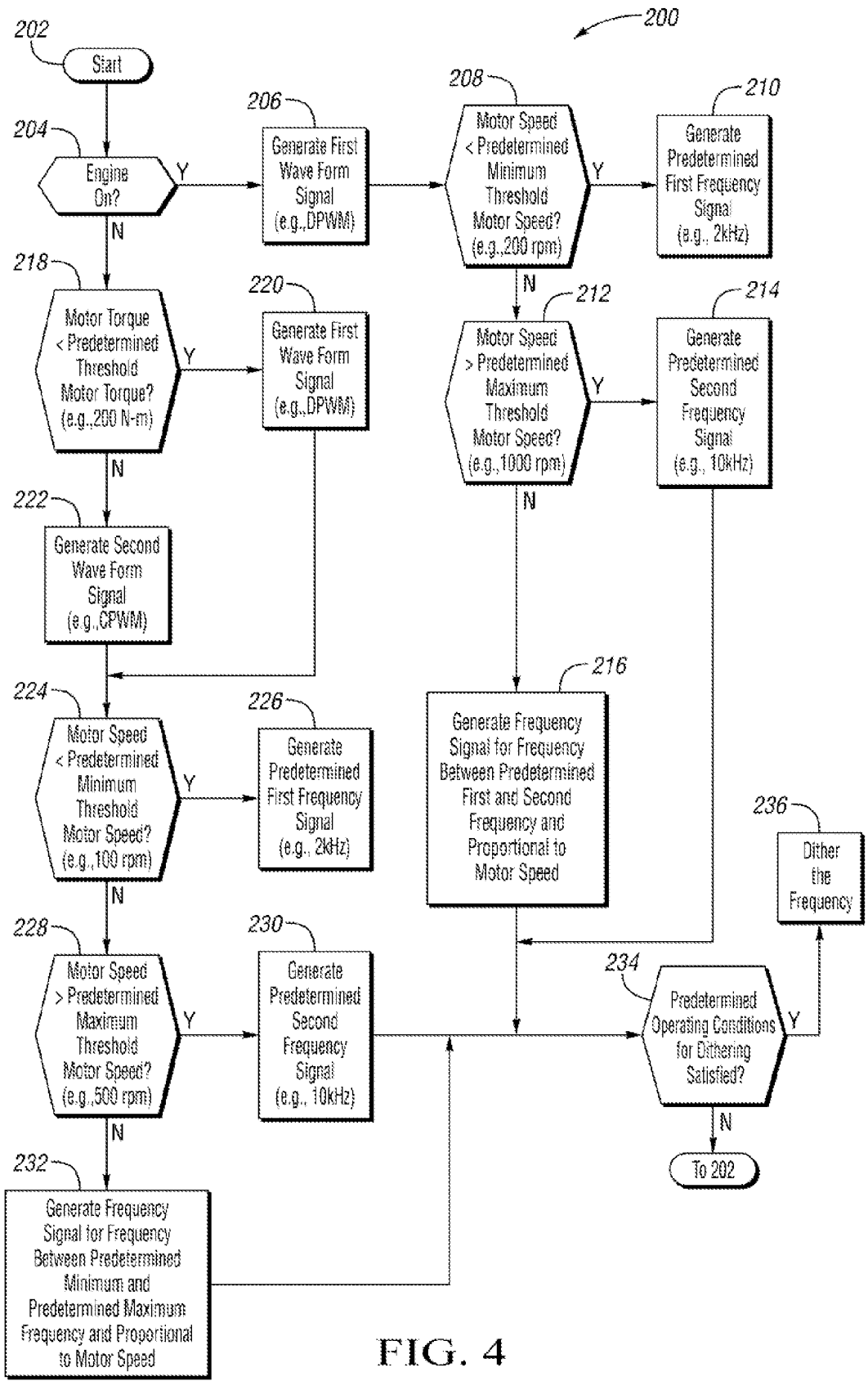
FIG. 4 is a flow diagram of a second method of controlling the power inverter of FIGS. 1-2.

FIG. 4 shows a method 200 of controlling a power inverter 22. The method 200 is one specific implementation of the broader method 100. Specifically, the method 200 begins at the start 202. The method 200 then determines in step 204 whether the engine 12 on/off state is on. If the engine 12 is on, the method 200 proceeds to step 206, and generates a first waveform signal for the inverter 22, so that the inverter 22 will control the switches to provide the first voltage waveform to the motor 16. In one non-limiting example, the first waveform signal can be a signal for a discontinuous pulse width modulated (DPWM) waveform for its superior efficiency, as the engine 12 can mask its relatively high noise level.

When the engine 12 has been determined to be on, the method 200 can also consider the operating parameters of the motor 16 to determine the switching frequency of the inverter 24. Specifically, the method proceeds from step 206 to step 208, in which the controller 24 determines whether the commanded speed of the motor 16 is less than a predetermined minimum threshold motor speed (i.e., a first motor speed), such as, but not limited to, 200 revolutions per minute (rpm). If the commanded motor speed is less than the predetermined minimum threshold motor speed, then the method 200 proceeds to step 210, in which the controller 24 generates and sends a predetermined first switching frequency signal to the inverter 22 so that the inverter 22 switches the switches 28A-C and 30A-C at a predetermined first frequency, such as but not limited to 2 kilohertz (kHz).

If it is determined in step 208 that the commanded motor speed is not less than the predetermined minimum threshold motor speed, the method 200 proceeds to step 212 and determines whether the commanded speed of the motor 16 is greater than a predetermined maximum threshold motor speed (i.e., a second motor speed), such as, but not limited to, 1000 rpm. If the commanded motor speed is greater than the predetermined maximum threshold motor speed, the method 200 proceeds to step 214, and the controller 24 generates a predetermined second switching frequency signal for a second predetermined frequency, such as, but not limited to, 10 kHz.

If it was determined in step 212 that the commanded motor speed is not greater than the predetermined maximum threshold motor speed, then the method 200 proceeds to step 216 and the controller 24 generates a switching frequency signal for a switching frequency that is between the first switching frequency and the second switching frequency and is proportional to the commanded motor speed (i.e., establishing a linear relationship of switching frequency to commanded motor speed between the minimum and the maximum threshold motor speeds).

Returning to step 204, if it is determined that the engine operating state is not on (i.e., no fuel supplied to the engine 12), then the method 200 proceeds to step 218 and determines whether the commanded motor torque of motor 16 is less than a predetermined minimum motor torque threshold, such as, but not limited to, 200 Newton-meters (Nm). If the commanded motor torque is less than the predetermined minimum motor torque threshold, then the method 200 proceeds to step 220 and generates the first waveform signal of step 206, such as the DPWM signal. Accordingly, the controller 24 commands the inverter 22 to control the switches 28A-28C, 30A-30C to provide a DPWM voltage waveform to the motor 16. However, if the commanded motor torque is not less than the predetermined minimum motor torque threshold, then the method 200 proceeds to step 222 and generates a second waveform signal, such as, but not limited to, a continuous pulse width modulated (CPWM) waveform signal, such as a sine waveform signal (SPWM). Accordingly, the controller 24 commands the inverter 22 to control the switches to provide a CPWM voltage waveform to the motor 16.

In addition to motor torque, the method 200 also considers the speed of the motor 16 when the engine 12 is off. Accordingly, after either of steps 220 and 222, the method 200 proceeds to step 224 to determine whether the commanded speed of the motor 16 is less than a predetermined minimum threshold motor speed (i.e., a third motor speed) that can be different than the minimum threshold motor speed of step 208 in the case when the engine 12 is on. For example, the predetermined minimum threshold motor speed of step 224 can be 100 rpm. If the commanded motor speed of motor 16 is less than the predetermined minimum threshold motor speed of step 224, the method 200 proceeds to step 226 and the controller 24 generates and sends a predetermined first frequency signal (duty cycle command signal 27) to the inverter 22 so that the inverter 22 controls the switches 28A-28C, 30A-30C to switch at the first frequency, such as but not limited to 2 kHz.

However, if the commanded speed of motor 16 is not less than the predetermined minimum threshold motor speed of step 224, then the method 200 proceeds to step 228 and the controller 24 determines whether the commanded speed of the motor 16 is greater than a predetermined maximum threshold motor speed (i.e. a fourth motor speed) which can be different from the maximum threshold motor speed of step 212 that applies when the engine 12 is on. In one non-limiting example, the predetermined maximum threshold motor speed of step 228 can be 500 rpm. If the commanded speed of the motor 16 is greater than the predetermined maximum threshold motor speed of step 228, then the method 200 proceeds to step 230 in which the controller 24 generates a predetermined second switching frequency signal, so that the inverter 22 will control the switches 28A-28C, 30A-30C to switch at the second frequency, such as, but not limited to, a switching frequency of 10 kHz.

If, however, the speed of motor 16 is not greater than the predetermined maximum threshold motor speed of step 228, then the method 200 proceeds to step 232 in which the controller 24 generates a switching frequency signal for a frequency that is between the predetermined first frequency of step 226 and the predetermined second frequency of step 230 and is proportional to the speed of the motor 16. Under the method 200, the threshold motor speeds for implementation of the first or second predetermined frequencies are lower when the engine 12 is off than when the engine 12 is on. This ensures that the generally more audible but more efficient lower frequency switching will be implemented less often when the engine 12 is off than when the engine 12 is on, as there is less masking noise for the switches 28A-28C, 30A-30C.

The method 200 may also ensure that the inverter 22 dithers the frequency of the switches 28A-28C, 30A-30C under appropriate circumstances, as dithering has been shown to disrupt the tonality of a particular switching frequency. "Dithering" is a method of reducing the amplitude of the distinct harmonics in the current spectrum by rapidly changing the switching frequency at a fixed rate. For example, dithering can vary the pulsed current between 9 and 11 kHz for a desired average of 10 kHz, reducing harmonics that might otherwise be present if a constant frequency of 10 kHz was applied. When dithering is employed, the frequency is periodically adjusted within a certain band around the average value. Equation (1) shows the instantaneous inverter switching frequency including the dither:

$$f_{sw} = f_{sw\_avg} + K_{rand} f_{span} \tag{1};$$

where $f_{sw}$ is the instantaneous switching frequency in kHz, $f_{sw\_avg}$ is the time average switching period in kHz, $f_{span}$ is the total peak-to-peak variation in switching frequency due to dither in kHz, and $K_{rand}$ is pseudo random number, in range of −0.5 to +0.5. A pseudo random number generator is used to compute $K_{rand}$, which can vary from −0.5 to +0.5. This number is updated at the dither rate ($f_{rate}$). Hence, the instantaneous switching frequency will jump to a new random value every $f_{rate}$. The key parameters which determine the performance of the dithering with respect to spreading the spectrum are the dither span and dither rate ($f_{span}$ and $f_{rate}$, respectively). Increasing the dither span spreads each harmonic over a wider frequency range. Increasing the dither rate makes the frequency adjustments more rapid, thus reducing the time the inverter 22 will operate at any given instantaneous frequency. A typical dither rate may be 2-10 milliseconds, while the dither span may be in the range of 10% peak-to-peak of the average switching frequency. The exact values will vary depending upon the application.

After each of steps 214, 216, 230, and 232, the method 200 proceeds to step 234, in which the controller 24 determines whether one or more predetermined vehicle operating conditions are satisfied under which the frequency to be generated according to step 214, 216, 230 or 232 is to be dithered. The predetermined vehicle operating conditions may include but are not limited to one or more of the speed of vehicle 10 being within a predetermined range of vehicle speeds, the commanded motor torque of motor 16 being within a range of commanded motor torques, the type of waveform signal generated by the controller, and the switching frequency signal generated by the controller 24. For example, in step 234, the commanded switching frequency can be compared to a predetermined dithering threshold frequency, which can be different than the frequencies considered in steps 210, 214, 216 and 230. If the predetermined dithering threshold frequency of step 234 is 12 kHz, then the controller 24 can command dithering under step 236 if the commanded switching frequency is less than 12 kHz. The relevance of any or all of the vehicle operating parameters considered in the determination of dithering in step 234 can be specifically tuned to the acoustic nature of the particular model of vehicle, as determined by vehicle testing.

If the predetermined vehicle operating conditions for dithering are determined to be satisfied in step 234, then the method proceeds to step 236 and the commanded frequency is further refined to be a dithered frequency. The method 200 then returns to the start at step 202, and continues through the method 200 to continually adjust the commanded voltage waveform, voltage frequency, and dither of the frequency to be provided by the inverter 22 to the motor 16.

If it is determined in step 234 that the predetermined vehicle operating conditions for dithering are not satisfied, then the method 200 returns to the start at step 202 without the switching frequency signal containing a command for dithering. Optionally, the torque and speed of the additional motor 17 and the vehicle speed can also be considered under the method 200 to establish the commanded waveform and frequency for the inverter 22.

While the best modes for carrying out the invention have been described in detail, those familiar with the art to which this invention relates will recognize various alternative designs and embodiments for practicing the invention within the scope of the appended claims.

The invention claimed is:

1. A method of controlling a power inverter coupled to a controller, to a voltage source, and to an electric motor in a vehicle powertrain having an engine, wherein the power inverter has inverter switches movable between open and closed positions, the method comprising:

receiving via the controller a commanded engine operating parameter; wherein the commanded engine operating parameter includes at least one of a commanded on/off state of the engine, a commanded engine speed, and a commanded engine torque; wherein the commanded on/off state of the engine is on if fuel is being supplied to the engine and off if fuel is not being supplied to the engine;

generating via the controller a voltage waveform signal and a switching frequency signal; wherein the voltage waveform signal commands switching the switches between the open and the closed positions during segments of an electric period of the electric motor; wherein the switching frequency signal commands the frequency of switching the switches between the open and the closed positions during the segments, the commanded switching and the commanded switching frequency together causing voltage to be provided from the power inverter to the electric motor with a voltage waveform; and wherein at least one of the voltage waveform signal and the switching frequency signal is at least partially based on said at least one commanded engine operating parameter;

wherein the voltage waveform signal is for a discontinuous pulse width modulated (DPWM) voltage waveform when the on/off state is on; and wherein the voltage waveform signal is for a continuous wave pulse width modulated (CPWM) voltage waveform when the on/off state is off and commanded motor torque for the electric motor is above a predetermined minimum threshold motor torque, and is for the DPWM voltage waveform when the on/off state is off and commanded motor torque for the electric motor is below the predetermined minimum threshold motor torque.

2. The method of claim 1, wherein the switching frequency signal is for a switching frequency that decreases as commanded engine speed increases.

3. The method of claim 1, wherein the switching frequency signal is for a switching frequency that increases as commanded engine torque increases.

4. The method of claim 1, wherein the switching frequency signal is for a predetermined first switching frequency when commanded motor speed for the electric motor is less than a predetermined minimum threshold motor speed, and is for a predetermined second switching frequency when the commanded motor speed for the electric motor is greater than a predetermined maximum threshold motor speed; and wherein the second switching frequency and the predetermined maximum threshold motor speed are greater than the first switching frequency and the predetermined minimum threshold motor speed, respectively.

5. The method of claim 4, wherein the predetermined minimum threshold motor speed and the predetermined maximum threshold motor speed are greater when the on/off state of the engine is on.

6. The method of claim 4, wherein the switching frequency signal is for a switching frequency that increases linearly in proportion to the commanded motor speed of the electric motor between the predetermined first switching frequency and the predetermined second switching frequency when the commanded motor speed of the electric motor is between the predetermined minimum threshold motor speed and the predetermined maximum threshold motor speed.

7. The method of claim 1, wherein said at least one of the voltage waveform signal and the switching frequency signal is further based on at least one operating parameter of an additional electric motor in the powertrain.

8. The method of claim 1, wherein said at least one of the voltage waveform signal and the switching frequency signal is further based on vehicle speed.

9. The method of claim 1, wherein the switching frequency signal commands dithering the switching frequency based on at least one predetermined vehicle operating condition.

10. A method of controlling a power inverter coupled to a controller, to voltage source, and to an electric motor in a vehicle powertrain having an engine, wherein the power inverter has inverter switches movable between open and closed positions, the method comprising:
receiving via the controller a commanded on/off state of the engine; wherein the commanded on/off state of the engine is on if fuel is being supplied to the engine and off if fuel is not being supplied to the engine;
determining via the controller whether the engine is on based on the commanded on/off state of the engine;
generating via the controller a voltage waveform signal and a switching frequency signal; wherein the voltage waveform signal commands switching the switches between the open and the closed positions during segments of an electric period of the electric motor; wherein the switching frequency signal commands the frequency of switching the switches between the open and the closed positions during the segments, the commanded switching and the commanded switching frequency together causing voltage to be provided from the power inverter to the electric motor with a voltage waveform based on a first set of criteria when the engine is on and based on a second set of criteria different from the first set of criteria when the engine is not on;
wherein the first set of criteria indicates a voltage wave form signal for a discontinuous pulse width modulated (DPWM) voltage waveform and a switching frequency signal for a switching frequency not less than a first predetermined minimum switching frequency and not greater than a first predetermined maximum switching frequency, and that increases linearly as a commanded speed of the electric motor increases from a predetermined first motor speed to a predetermined second motor speed; and
wherein the second set of criteria indicates a voltage waveform signal for a discontinuous pulse width modulated (DPWM) voltage waveform signal when commanded motor torque for the electric motor is below a predetermined minimum threshold motor torque, and indicates a voltage waveform signal for a continuous wave pulse width modulated (CPWM) voltage waveform when the engine is not on and commanded motor torque for the electric motor is above the predetermined minimum threshold motor torque.

11. The method of claim 10, wherein the second set of criteria indicates a switching frequency not less than the first predetermined minimum switching frequency and not greater than the first predetermined maximum switching frequency and that increases linearly as a commanded speed of the electric motor increases from a predetermined third motor speed to a predetermined fourth motor speed; and wherein the predetermined third motor speed is less than the first motor speed and the predetermined fourth motor speed is between the first and the second motor speeds.

12. The method of claim 10, wherein the first set of criteria includes commanded engine speed; wherein the switching frequency signal is for a switching frequency that decreases as commanded engine speed increases;
wherein the first set of criteria further includes commanded engine torque; and wherein the switching frequency signal is for a switching frequency that increases as commanded engine torque increases.

13. The method of claim 10, wherein the switching frequency signal commands dithering the switching frequency based on at least one predetermined vehicle operating condition.

14. The method of claim 10, wherein the voltage waveform signal and the switching frequency signal are at least partially based on vehicle speed.

* * * * *